United States Patent [19]

Williams et al.

[11] Patent Number: 4,810,523

[45] Date of Patent: Mar. 7, 1989

[54] PRESSURE-SENSITIVE ADHESIVES

[75] Inventors: Jeffrey D. Williams, Washington, D.C.; Marvin L. Young, Rockville, Md.; Syed S. Ahmad, Lanham, Md.; Jackson A. Ransohoff, Bethesda, Md.

[73] Assignee: Neutron Products, Inc., Dickerson, Md.

[21] Appl. No.: 941,350

[22] Filed: Dec. 15, 1986

Related U.S. Application Data

[63] Continuation of Ser. No. 731,207, May 6, 1985, abandoned.

[51] Int. Cl.[4] .................. B05D 5/10; C08F 2/54; C08F 20/18

[52] U.S. Cl. .................. 427/36; 427/208.4; 522/4; 522/167; 522/182; 522/912

[58] Field of Search .................. 522/154, 912, 182; 427/42, 36, 208.4

[56] References Cited

U.S. PATENT DOCUMENTS

| | | | |
|---|---|---|---|
| 2,803,598 | 8/1957 | Black et al. | 204/158 |
| 2,803,599 | 8/1957 | Tutwiler et al. | 204/158 |
| 2,941,934 | 6/1960 | Anspon et al. | 204/158 |
| 3,081,244 | 3/1963 | Campanile | 204/154 |
| 3,661,618 | 5/1972 | Brookman et al. | 117/62 |
| 3,725,115 | 4/1973 | Christenson et al. | 117/93 |
| 3,772,063 | 11/1973 | Fukukawa et al. | 117/93 |
| 3,897,295 | 7/1975 | Dowbenko et al. | 156/272 |
| 3,929,602 | 12/1975 | Kactsu et al. | 204/159 |
| 4,052,527 | 10/1977 | Pastor et al. | 428/463 |
| 4,151,055 | 4/1979 | Stueben et al. | 204/159 |
| 4,181,752 | 1/1980 | Martens et al. | 427/54.1 |
| 4,234,662 | 11/1980 | Pastor et al. | 428/500 |
| 4,305,854 | 12/1981 | Rowe | 260/24 |
| 4,413,019 | 11/1983 | Brenner | 427/36 |
| 4,438,177 | 3/1984 | Potter et al. | 428/355 |

FOREIGN PATENT DOCUMENTS

| | | |
|---|---|---|
| 0108630 | 5/1984 | European Pat. Off. . |
| 2134468 | 1/1972 | Fed. Rep. of Germany . |

OTHER PUBLICATIONS

Ohta et al., "Radiation Curing", Radiat. Phys. Chem., vol. 22, No. 3–5, pp. 795–802, 1983, Great Britain.

*Primary Examiner*—John C. Bleutge
*Assistant Examiner*—A. H. Koeckert
*Attorney, Agent, or Firm*—Bernard, Rothwell & Brown

[57] ABSTRACT

Acrylate-based pressure-sensitive adhesives are produced by a process in which a liquid, polymerizable monomer composition containing at least one acrylate monomer is placed in a closed reaction vessel, deaerated and the monomer(s) are polymerized by exposure to ionizing radiation such as gamma irradiation. The process allows for the direct production of low-solvent or solventless acrylate-based adhesives suitable for application by hot-melt techniques.

20 Claims, No Drawings

PRESSURE-SENSITIVE ADHESIVES

This is a continuation of application Ser. No. 731,207, filed May 6, 1985, now abandoned.

BACKGROUND OF THE INVENTION

1. Field of the Invention

This invention relates to the production of acrylate-based pressure-sensitive adhesives by polymerization which is initiated via exposure of monomers to ionizing radiation. The invention further relates to the production of such adhesives in a low-solvent or solventless form suitable for hot melt application.

2. Prior Art

Pressure-sensitive adhesives are materials which characteristically possess tack, that is bonding, when applied to adherents after brief contact at low pressure, develop greater bond strength with greater application pressure, yet desirably can be cleanly and easily removed from their adherents. Originally, pressure-sensitive adhesives, which were developed for self-adhering medical plasters and bandages, were based on natural rubber. Due to its high glass transition temperature, rubber does not possess pressure-sensitive adhesive properties at room temperature. Consequently, natural or synthetic rubbers must be compounded with a variety of tackifiers, such as terpenes or rosins, and often with other additives in order to function effectively as pressure-sensitive adhesives.

Pressure-sensitive adhesives produced from natural rubber dominated the field prior to World War II, a time when many pressure-sensitive adhesive products were developed. These include tapes for medical, electrical, packaging and processing applications, as well as self-adhering labeling, construction and decorative materials. Shortages of natural rubber led to the development of synthetic polymeric materials which found application in pressure-sensitive adhesives, including synthetic rubbers based on styrene-butadiene or styrene-isoprene polymers.

Additionally, there were developed a class of pressure-sensitive adhesives based on homopolymers or copolymers of acrylic acid esters. Acrylate-based pressure-sensitive adhesives offer some significant advantages over those based on natural or synthetic rubber. Due to their low glass transition temperatures, certain acrylate polymers have good tack at room temperature and can be used without the necessity of compounding with tackifying agents. Thus, acrylate-based products provide manufacturers of pressure-sensitive adhesive products with ready-to-coat pressure-sensitive adhesives, eliminating the need for in-house compounding operations.

Monomers useful in preparing acrylate-based pressure-sensitive adhesives are generally those having from 2 to 8 carbons in the ester group. Of particular importance are ethyl acrylate, n-butyl acrylate, isobutyl acrylate and 2-ethylhexyl acrylate. If desired, these monomers can be copolymerized with other ethylenically unsaturated monomers to yield satisfactory pressure-sensitive adhesives. Suitable comonomers include, for example, acrylic acid, methacrylic acid, vinyl acetate, vinyl pyrrolidone and vinyl ethers. If desired, difunctional or polyfunctional monomers, such as diacrylates, can also be copolymerized with the adhesive polymer in small amounts to impart cross-link density.

In order to be useful, a pressure-sensitive adhesive should have a balance of properties, e.g., tack, peel strength and creep resistance, best suited to the particular end use in which the adhesive is to be employed. The properties of a pressure-sensitive adhesive are primarily affected by monomer composition, molecular weight and cross-link density, all of which determine the balance of adhesivity and cohesivity in the polymer Generally, the monomer composition determines glass transition temperature and surface chemistry, both of which affect adhesion For linear polymers, higher molecular weights normally result in better cohesion. Cohesion also increases with the degree of covalent cross-linking and secondary intermolecular bonding It is possible to produce a low molecular weight acrylate polymer which has good adhesivity but which will fail cohesively. Cohesivity can be improved by introducing cross-links into the polymer, after it has been applied to the substrate, by exposure to ultraviolet or ionizing radiation. However, high cross-link density can cause a loss of viscoelasticity, which in turn results in a loss of tack. In addition, many webbing substances have poor radiation resistance and are unable to tolerate doses required to impart good cohesivity.

In many commercial applications of pressure-sensitive adhesives, it would be preferred to use an acrylate polymer or copolymer having an intrinsic viscosity of at least about 2.5 dl/g. Unfortunately, prior art processes for producing acrylate polymers have been limited by considerations of reaction kinetics and thermodynamics to values below about 1.8 dl/g. Since various molecular weight fractions may affect adhesion and cohesion differently, molecular weight distribution, as well as average molecular weight, affects the properties of the adhesive. Ideally, a process for producing an acrylate-based polymer for a pressure-sensitive adhesive provides a means for controlling both molecular weight, i.e., intrinsic viscosity, and molecular weight distribution.

Despite the advantages which acrylate-based pressure-sensitive adhesives offer in comparison with compounded rubber, acrylates produced by the processes of the prior art also have a number of serious drawbacks. The conventional method of preparing pressure-sensitive adhesives from acrylate monomers involves free radical addition polymerization in an organic solvent using chemical initiators. Chemical initiators commonly employed include organic peroxides, azobis compounds, persulfates and oxidation-reduction systems. Solvents include a variety of aliphatic hydrocarbons, aromatic hydrocarbons, esters, ketones and others. The product consists of a high viscosity polymer solution between 20 and 45 weight percent polymer concentration.

The polyacrylate solution is coated onto a substrate, e.g., a backing or webbing such as tape or label stock The volatile solvent is then evaporated, thereby leaving a nearly solvent-free layer of adhesive. The practical manufacture of pressure-sensitive adhesive products such as tapes, labels and others also often requires the use of prime and/or release coatings or inclusion of a release coated interlayer.

The conventional methods for solution polymerization and coating of acrylate-based pressure-sensitive adhesives possess several inherent drawbacks. Chemical initiators react to yield free radicals, which initiate the chain reaction propagation by which the addition polymerization proceeds. In all cases, the rate of free radical generation or initiation (which affects the molecular weight of the product) is highly temperature dependent, often increasing by an order of magnitude for every 10° C. temperature rise. Acrylate polymerization is a very exothermal reaction, yielding approximately 20 kilocalories per mole of monomer Reaction control is therefore limited by the ability to remove heat from the system. Failure to maintain a reasonable temperature profile can result in undesirably low molecular weight, poor product performance, poor reproducibility and, in extreme instances, violent runaway reaction. Temperature control may be accomplished by heat transfer or solvent reflux and may be aided by gradual introduction of the initiator. However, the ability to provide adequate heat removal and mixing of initiator for a commercial scale reactor is limited by the bulk viscosity of the system. Viscosity is determined by the molecular weight and concentration of the polymer. Therefore, the use of conventional solution polymerization limits both the molecular weight and final solids concentration of the product, and as a result, using the methods of the prior art, high-solids acrylate adhesives are inferior to the solution polymer analogs.

The use of chemical initiators poses a further drawback in that a low molecular weight fraction consisting of unreacted catalyst and catalyst fragments invariably will be incorporated into the adhesive. These low molecular weight species are undesirable because they are free to migrate to the adhesive bond surface, where they inhibit performance. Furthermore, for biomedical applications, such as dermal application in first aid products, the initiator fragments may irritate the skin or possibly show other toxic effects.

The conventional coating of acrylate polymer solutions and subsequent drying is also problematic. The drying phase is highly energy intensive, usually the most costly and time-consuming in the manufacturing chain. Evaporation of large volumes of solvent in the workplace may also violate environmental and occupational safety regulations and create a fire and explosion hazard. Moreover, the resulting loss of solvent is expensive. While solvent recovery systems may help alleviate both material loss and environmental damage, these systems are very expensive to install and operate.

An alternative to solution-based polymers involves the use of water-borne acrylate polymer latices which are produced by emulsion polymerization. While the use of an acrylic latex as a substitute for solutions eliminates the problems associated with the evaporation of hydrocarbons, it still requires the evaporation of large volumes of water. While the drying step may not have the same environmental consequences and pollution abatement costs, the energy requirements are greatly increased, thus it remains expensive and time-consuming. Moreover, the emulsion polymerization process by which the latex is produced requires both water-soluble chemical initiators and significant amounts of surfactants. These low molecular weight species may be detrimental to product suitability and performance. Furthermore, polar monomers with appreciable solubility in water may be difficult or impossible to incorporate into the polymer.

In response to the need to reduce energy consumption and avoid the environmental and work safety problems associated with solution and latex polymers, manufacturers of acrylate-based pressure-sensitive adhesive products have, in recent years, developed methods for curing or polymerizing acrylate monomers inplace on a substrate using ultraviolet or electron beam energy. In these methods, a liquid mixture of acrylate monomers and/or prepolymers possibly with other components, is applied as a film or coating onto a substrate, such as tape or label stock. The coatings or films usually have a thickness in the range of about 0.5 $\mu$m to 500 $\mu$m. The coating on the film is exposed to ultraviolet radiation (if photoinitiators are present in the coating) or electron beam radiation to polymerize the monomers and/or cure the system by the introduction of cross-links. These processes must be operated at very high free radical concentrations, and radiation exposure rates are in the megarads per second range since economic and practical considerations require that the coating be polymerized and cured in a matter of a few seconds. As a result, adhesives produced in this manner have a low degree of polymerization and contain low molecular weight fractions which often affect adhesive performance adversely. Although both ultraviolet and electron beam curing may give satisfactory results for some products, high residual monomer is often a problem and the products obtainable may be limited to highly cross-linked systems.

Additionally, the products which may be manufactured by these processes are limited to webbings which have enough radiation resistance to withstand the relatively high doses required for curing. These processes may be employed only to manufacture certain pressure-sensitive products, such as tapes, by in-situ polymerization; and they are not suitable for the production of bulk adhesives which may be subsequently applied to any number of substrates regardless of radiation resistance.

U.S. Pat. Nos. 4,165,266, 3,772,063 and 3,661,618 describe exemplary systems for in-place radiation polymerization or curing of acrylate coatings to produce pressure-sensitive adhesive products.

An alternative to the application of pressure-sensitive adhesives in the form of solutions, latices or monomer compositions for in-place radiation curing is hot-melt application. This technique, which has been used extensively for the application of compounded rubber adhesives, requires that the adhesive polymer be in a solventless or low-solvent (i.e., >70% solids) form. In hot-melt applications, the viscoelastic solid is heated to its softening or melting point and applied to the substrate by means such as calendering, spraying, or extrusion. Hot-melt application of adhesives is relatively simple and avoids or ameliorates the need for evaporating solvents with the attendant energy costs and environmental hazards.

As previously indicated, the production of acrylate polymers in a solventless or low-solvent form suitable for hot-melt application is difficult, if not impossible, using polymerization procedures of the prior art. Consequently, there are few commercial hot-melt, pressure-sensitive adhesives based on acrylate polymers, and these are for narrow applications, despite the fact that the art has long sought such products. While some hot-melt acrylate adhesives have been produced by stripping off solvent from conventionally produced acrylate solution polymers, these adhesives have not been widely accepted due to their poor performance properties. Moreover, this procedure does not eliminate the need for evaporating large quantities of solvent.

Hot melt acrylic adhesives have been reported which are said to show reversable thermal cross-linking upon cooling. These and other highly cross-linked hot melt adhesives may show marked reduction in viscoelasticity and thus poorer performance.

It is a primary object of the present invention to provide a process for producing acrylate-based pressure-sensitive adhesives which provide for accurate control of molecular weight and molecular weight distribution. In particular, it is an object of the invention to provide a process which allows for the production of acrylate-based pressure-sensitive adhesives having intrinsic viscosities above about 2.5 dl/g.

It is a further object of the invention to provide a process for producing acrylate-based, pressure-sensitive adhesives which are free of residual polymerization initiators, surfactants and other low molecular weight species.

It is a further object of the invention to provide a process for producing acrylate-based, pressure-sensitive adhesives in a low-solvent or solventless form suitable for hot-melt application.

These and other objects of the invention will be readily apparent from the description that follows.

SUMMARY OF THE INVENTION

The present invention provides a process for producing pressure-sensitive adhesives in bulk which comprises:
(a) introducing, to a sealable reaction vessel, a liquid, polymerizable monomer composition, said composition comprising:
  (i) from 65 to 100 parts (based on total monomer) of at least one acrylate monomer of the formula:

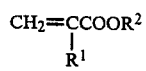

wherein $R^1$ is hydrogen or methyl and $R^2$ is a straight or branched chain alkyl having from 2 to 8 carbon atoms,
  (ii) from 0 to 35 parts (based on total monomer) of at least one ethylenically unsaturated comonomer, per 100 parts of polymerizable monomer;
(b) deaerating the liquid, polymerizable monomer composition before or after introducing it into the vessel;
(c) sealing the reaction vessel and polymerizing the monomers in the sealed vessel by exposing them to ionizing radiation at a dose rate from about 1 kilorad per hour to about 1 kilorad per second.

If desired, the composition may also include up to about 80% (by weight of the total composition) of an appropriate solvent.

The process of the invention allows for the production of acrylate-based, pressure-sensitive adhesives with close control over molecular weight and molecular weight distribution. This permits a polymer to be tailored to specific applications over a broad range of properties. The scope of interest for application of the process is broad, ranging from intrinsic viscosities of less than 0.75 to more than 3.6; but the utility of the process is most important when it is used to produce polymers of higher molecular weight than can be practically produced on a commercial scale by prior art techniques. In particular, the process of the invention allows for the production of acrylate-based, pressure-sensitive adhesives having intrinsic viscosities above 2.5 dl/g, if desired.

Using the process of the invention, it is possible to polymerize acrylates in the absence of solvent or in a small amount of solvent in order to produce acrylate-based, pressure-sensitive adhesives suitable for hot-melt application. Indeed, we have discovered that high molecular weight polyacrylates can be produced by radiation-induced bulk polymerization without encountering the types of problems which are associated with chemically-initiated polymerization in a high-viscosity system. We have also determined that the process can be used to produce polymers which for some applications, display properties superior to those produced conventionally.

DETAILED DESCRIPTION OF THE INVENTION

The process of the invention entails the polymerization of acrylate monomers in a closed reaction vessel to produce an adhesive product that can subsequently be applied to a webbing. The process of the invention is distinguished from the in-place radiation curing of thin films or coatings directly on a webbing as described in the prior art. In accordance with the teachings of the invention, a liquid, polymerizable monomer composition is introduced to a closed or sealable container of dimensions and materials suitable for efficient exposure of the contents to ionizing reduction at exposure rates of one kilorad per hour to one kilorad per second. The particular geometry of the reaction vessel will be dictated first by considerations of product uniformity, which is affected by the tendency of the material to attenuate the radiation, and second by product configurations desirable to the end user. The volume of the polymerizable liquid contained in the reaction vessel will have dimensions which are orders of magnitude greater than typical adhesive film thicknesses useful in pressure sensitive products. Generally, the volume of polymerizable liquid will have a dimension in every direction of at least about 0.5 cm.

In a preferred embodiment of the invention, the liquid, polymerizable monomer composition is placed in a cylindrical container having a diameter of from about 1.0 in. to about 26 in. and then the cylindrical container can be rotated about its axis, with the axis parallel to the source of radiation, in order to obtain more uniform irradiation by minimizing attenuation by the contents. For example, gamma ray attenuation of about 20% occurs at the axis of a 10-in. diameter cylinder and such non-uniformity is generally acceptable.

Alternatively, comparable uniformity of exposure can be achieved in larger dimensions in a rotating 24-in. diameter drum containing a central void of about 16 inches. Such a container would provide for a greater spread in the molecular weight distribution since the free radical concentration of the contents will vary appreciably as the drum rotates. For dilute solutions, the container can comprise pipes through which the reactants can flow, but both solutions and bulk polymers can conveniently be irradiated in discrete containers such as drums or static pipe reactors.

The liquid, polymerizable monomer composition comprises from 65 to 100 parts of acrylate monomer, per 100 parts by weight of polymerizable monomer in the composition. The acrylate monomer portion of the composition comprises at least one acrylate (or methacrylate) monomer of the formula

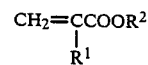

wherein $R^1$ is hydrogen or methyl and $R^2$ is a straight or branched chain alkyl having from 2 to 8 carbon atoms. Preferred acrylate monomers are those selected from the group comprising: 2-ethylhexyl acrylate, n-butyl acrylate, isobutyl acrylate and ethyl acrylate, with 2-ethylhexyl acrylate being most preferred.

The liquid, polymerizable monomer composition can, if desired, contain up to about 35 parts of an ethylenically unsaturated comonomer per 100 parts by weight of polymerizable monomer in the composition. Any of the known, ethylenically unsaturated monomers conventionally employed in the production of polymers having adhesive properties can be used. Preferred comonomers are those selected from the group comprising: acrylic acid, methacrylic acid, N-substituted acrylamides or methacrylamides, ccrylonitrile, methacrylonitrile, alkylol acrylates, maleic anhydride, and N-vinyl pyrrolidone.

While we have found that the method of the invention produces pressure-sensitive adhesives having good internal cohesion without the necessity of adding crosslinking agents, one can, if desired, increase the degree of cohesion by adding to the liquid, polymerizable composition a small amount of a difunctional, ethylenically unsaturated monomer such as a diacrylate compound or glycidyl methacrylate. Diacrylate compounds, i.e., compounds having two acrylyl or methacrylyl groups, are particularly useful. One can mention as merely exemplary of such compounds, diethylene glycol diacrylate, propylene glycol diacrylate, 1,3-butanediol diacrylate, neopentyl glycol diacrylate, tetraethylene glycol diacrylate, 1,3-propanediol diacrylate and the like, as well as the corresponding dimethacrylates. If used, the crosslinking monomer is present at up to about 5 parts per 100 parts of polymerizable monomer in the composition. Glycidyl methacrylate, N-methylol acrylamide and other functional monomers contain nonethylenic reactive groups which may subsequently be chemically or photochemically cross-linked upon application to the webbing.

In order to control the molecular weight of the adhesive polymer, there may also be present in the liquid, polymerizable monomer composition a chain transfer agent. A number of chain transfer agents can be employed, with isopropyl alcohol and triethanolamine being preferred. The chain transfer agent, if used, can be present in amounts up to about 4 parts per 100 parts of the liquid, polymerizable monomer composition. As those skilled in the art are aware, increasing the concentration of chain transfer agent will reduce the molecular weight of the polymer. Generally, we have found that the use of a chain transfer agent is not necessary in the practice of the invention when the polymerization is carried out in the presence of a solvent.

Preferred liquid, polymerizable monomer compositions in the practice of the invention are those in which 2-ethylhexyl acrylate or n-butyl acrylate is either the sole polymerizable monomer, or copolymerized with other vinyl monomers. For example, 2-ethylhexyl acrylate and/or butyl acrylate copolymerized with acrylic acid, vinyl pyrrolidone, or vinyl acetate.

The liquid, polymerizable monomer composition can be polymerized in the presence or absence of a solvent. Indeed, a major advantage of the process of the invention is that it allows for the production of low-solvent or no-solvent acrylate-based adhesives suitable for hot-melt application. Nonetheless, the process of the invention can also be used to polymerize the monomer composition in the presence of a solvent, if desired. Any conventional volatile organic solvent in which the monomers and the resultant polymer are soluble and which does not interfere with the polymerization reaction can be employed. The solvent may be a substituted or unsubstituted aliphatic or aromatic hydrocarbon. Preferred solvents are heptane, toluene, acetone and tetrahydrofuran. The solution can contain from 20 to 100 parts by weight of the liquid, polymerizable monomer composition described above and from 0 to 80 parts by weight of solvent. The decision whether to employ a solvent in the polymerization is primarily dependent on the viscosity which one desires in the final product, i.e., whether one desires to apply the product as a low viscosity film or coating or as a hot-melt adhesive. When one desires to apply the product as a holt-melt adhesive, the polYmerization is carried out in a solution containing greater than 70% by weight of the liquid, polymerizable monomer composition and less than 30% by weight of solvent. The preferred formulation for hot-melt adhesives is solventless. High solids solution polymers exhibiting bulk viscosities of under about 500,000 cps may be applied by cold flow processes. The solvent must then be evaporated; however, by this means the capital and operating costs associated with conventional low solids solutions may be greatly reduced.

In carrying out the process of the invention, the monomer(s), chain transfer agent (if present) and solvent (if present) are blended together and charged to the reaction vessel. In the case of low-solvent or solventless polymerizations, it is preferred to line the reaction vessel with a barrier surface, since the reaction product has a high degree of tack and may otherwise be difficult to remove from the vessel. The barrier material may consist of material which is non-reactive with and shows no solubility or permeation by the monomer solvent mixture and possesses suitable radiation resistance. The preferred barrier material will have as its surface in contact with the adhesive composition a material such as a silicone or polyfluorocarbon to which the acrylic polymer will not adhere. The reaction vessel can be constructed of any material which is resistant to and penetrated by the ionizing radiation which is employed to polymerize the monomer composition.

Since acrylate monomers are usually provided commercially with a polymerization inhibitor, such as the methyl ether of hydroquinone (MEHQ), which inhibits polymerization in the presence of oxygen, it is necessary to displace any dissolved oxygen which is present in the monomer composition prior to carrying out the polymerization reaction. This can be achieved by sparging nitrogen through the monomer mixture.

Nitrogen sparging may be accomplished directly in the reaction container or prior to loading providing the transfer is made under inert conditions. It is important that the reaction container prevent recontact with oxygen during any stage prior to the completion of polymerization. The reaction container may be of any oxygen impervious material which is both stable in and transparent for the ionizing radiation employed and thermally stable at the operating temperatures of the process. We have employed as polymerization vessels hardwall cylindrical reactors constructed of glass, aluminum or stainless steel. These have been equipped with a means for either in situ sparging or inert transfer of deaerated monomer. In addition, we have used "soft" containers. These are flexible leak-proof multilayer bags. The contact layer consists of a non-stick surface such as silicone; the outer layer is a material impervious to oxygen such as aluminum foil; the middle layer is a heat sealable material such as polyethylene. The bags are filled with deaerated monomer and sealed under an inert atmosphere, for instance, in a nitrogen filled glove box. The bags are placed in an appropriate supporting vessel and can be safely removed from the inert atmosphere and subsequently polymerized.

Polymerization is initiated by exposing the liquid, polymerizable monomer composition to ionizing radiation. Any conventional source of penetrating ionizing radiation may be employed, i.e., any source of low LET (linear energy transfer) radiation which is capable of extracting protons from the monomers to create free radicals which propagate to form polymer chains. The known types of ionizing radiation include, for example, gamma rays and X-rays. We prefer to employ gamma radiation as the ionizing radiation. Suitable sources of gamma radiation are well known and include, for example, radioisotopes such as cobalt-60 and cesium-137.

As previously indicated, the process of the invention allows for careful control of both molecular weight and molecular weight distribution in the final polymer, thereby allowing the practitioner to "tailor" the properties of the resulting pressure-sensitive adhesive. Several variables can be manipulated to control the molecular weight of the final product, the most important being radiation dose rate and concentration of chain transfer agent. Unlike the chemically initiated polymerization procedures of the prior art, in which the rate of chain initiation (and consequently molecular weight) is highly temperature dependent, the polymerization procedure of the present invention is relatively unaffected by temperature, except in monomer systems where chain transfer is an important factor. Consequently, limitations on the ability to remove heat from the reactants do not interfere substantially with the ability to control molecular weight in the process of the invention. Nevertheless, it was surprising to find that solventless polymerizations, essentially adiabatic, could reach exotherms exceeding 200° C. and still yield product with desirable, even superior, properties. As previously indicated, increasing the concentration of chain transfer agent generally reduces the molecular weight of the product. Likewise, increasing the dose rate results in a reduction in molecular weight of the product.

Polymerization can be carried out over a wide range of dose rates in the range of a kilorad per second to about a kilorad per hour. It is preferred, however, that the dose rate be kept between 5 and 250 kilorads per hour. Dose rates exceeding a few tenths of a kilorad per second generally result in polymers of too low molecular weight to be useful as adhesives due to cohesive failure or low creep resistance. However, some polymer formulations produced above this range may find application in specialty products. In other cases, these low molecular weight polymers may subsequently be cross-linked to provide sufficient cohesion. Dose rates below a kilorad per hour generally result in polymers with molecular weights too high to be useful due to low tack and adhesive failure.

Although temperature is relatively less important in controlling molecular weight in the process of the invention than in chemically initiated polymerizations, it may nevertheless be a significant factor in viscous compositions having relatively high chain transfer to monomer coefficients such as 2-ethylhexyl acrylate and N-vinyl pyrrolidone or for compositions having relatively high concentrations of chain transfer agent. For such compositions temperature, as well as dose rate, can be varied to obtain the desired molecular weight, with increasing temperature resulting in lower molecular weight. Thus, dose rate, chain transfer agent concentration and temperature can all be used to control molecular weight. In low-solvent or solventless polymerizations, such as those used to produce the hot-melt and cold-flow adhesives of the invention, molecular weight is controlled essentially by manipulation of composition, dose rate, and initial temperature since the viscosity buildup in the reaction mixture makes the removal of heat and control of reaction temperature difficult.

The molecular weight distribution can be controlled by varying the dose rate in a continuous or stepwise manner during the polymerization reaction. It is thus possible to produce polydisperse or polymodal molecular weight distributions which make possible the production of a wide range of products having a variety of adhesive and cohesive products. For example, the polymerization reaction may be carried out at a first dose rate for a period of time and then the dose rate changed for the remainder of the polymerization in order to produce an essentially bimodal molecular weight distribution.

The total integrated radiation dose primarily affects the degree of conversion of monomer to polymer. In general, it is desirable to irradiate to conversions of 95% or greater and preferably to conversions of 99.5% or higher. However, the reaction rate becomes asymptotic with time as monomer concentration is depleted, and it becomes more difficult to achieve very high conversion. Low solvent or solventless sytems are preferred in this aspect since higher viscosity aids in monomer reaction at high conversion. Thus, solventless compositions may be polymerized using the process of the invention to very low levels of residual monomer. This is particularly important in pressure-sensitive adhesives used for medical applications, where even small amounts of residual monomer may irritate the skin.

During the asymptotic or monomer depletion stage of the reaction, radiation cross-linking will begin to occur. Radiation induced cross-linking will be more significant as solids concentration increases. Cross-linking may be minimized by the inclusion of chain transfer agent but only at the cost of reduced molecular weights.

There are cases where over-irradiation to achieve a degree of cross-linking may be permissible, or even desirable. Cross-links may be tolerated or even desired up to a certain density as they give greater cohesion and creep resistance. However, in too great a density, cross-linking will adversely affect product coating and performance; thus, over-irradiation must be limited. Cross-linking relative to monomer consumption near the end of the reaction is greater at higher dose rates. To achieve high degrees of conversion while preventing product deterioration, a finishing step dose rate of less than 20 kilorads per hour is preferred.

The process may be varied to produce a wide variety of polymer and adhesive properties, among them molecular weight distribution, residual monomer concentration, and cross-link density. Post application ultraviolet or ionizing irradiation may be employed to further alter properties. Final adhesive properties will depend on both polymerization and post-application processing conditions. Products containing some degree of residual monomer may be particularly useful where post application irradiation is employed.

The higher molecular weights obtainable and pre-application cross-linking make possible the production of acrylic adhesives, either in solution or solventless, which require significantly less post-application curing, by either chemical or radiation processes, than many existing products.

As previously indicated, the proess of the invention may be carried out in the absence or near absence of solvent to produce acrylate-based pressure-sensitive adhesives suitable for hot-melt application. As the amount of solvent in the reaction system approaches zero, reaction conditions become essentially adiabatic due to the inability to remove the heat of polymerization from the reaction mixture. Nevertheless, we have discovered that the polymerization process of the invention can be performed under adiabatic conditions without a breakdown in molecular weight or creation of a runaway reaction. It was a particularly surprising to find that the process of the invention provided means for the production of hot-melt acrylate-based pressure-sensitive adhesives having intrinsic viscosities above 3.0 dl/g.

High viscosity cold flow adhesives may be produced by polymerizing in the presence of about 75% solvent to about 20% solvent although the minimum solvent concentration practical for cold flow application will depend on the molecular weight of the polymer.

The hot-melt adhesives of the invention are produced by carrying out the polymerization reaction in the presence of not more than 30% by weight of a solvent, preferably not more than 5% by weight of a solvent, and most preferably in the absence of solvent.

The following examples are presented in order to further illustrate the practice of the invention and are not intended to limit the scope of the invention in any way. Unless otherwise indicated, all parts and percents are by weight and all temperatures are in degrees Celsius. Intrinsic viscosities were determined at 27° C. in heptane.

EXAMPLES 1-3

Solventless Polymerization at a Single Dose

In each of Examples 1-3, a mixture of 2-ethylhexyl acrylate and isopropyl alcohol as a chain trnsfer agent was charged into a polyethylene or polyethylene-silicone laminate lined cylindrical pressure vessel (3½ in. diameter). The monomer was then deaerated by nitrogen sparging through a dip tube, after which the reactor was sealed. The vessel was exposed to gamma radiation from a cobalt-60 source at a dose and dose rate as indicated in Table 1. In each example, the product obtained was a tacky, elastic solid at room temperature which softened to a viscous liquid at 170° to 200° C. The polymers, all of which displayed good tack and peel resistance, were suitable for application as hot-melt adhesives. Dose rates, dose, monomer conversion and intrinsic viscosity of the products are given in Table 1.

TABLE 1

| Example No. | 2-EHA p.b.w. | IPA p.b.w. | Dose Rate Krad/hr. | Total Dose KRads | I.V. dl/g | Conversion % |
|---|---|---|---|---|---|---|
| 1 | 98 | 2 | 100 | 50 | 1.47 | 96.3 |
| 2* | 98 | 2 | 100 | 50 | 0.92 | 93.7 |
| 3 | 98 | 2 | 350 | 175 | 1.22 | 96.5 |

2-EHA = 2-ethylhexyl acrylate
IPA = isopropyl alcohol
I.V. = intrinsic viscosity
*Polymerized at an initial temperature of 40° C. All other polymerizations begun at room temperature

EXAMPLES 4-39

Variation of Polymerization and Post-Application Parameters

A mixture of 2-ethylhexyl acrylate with 0.3% isopropyl alcohol was deaerated in a nitrogen-filled glove box. Approximately 100 g samples of this mixture were charged into 6 silicone release coated oxygen impervious bags and heat sealed. These samples were irradiated at a dose of 20 krad/hr. for the total doses given in Table 2 along with properties obtained.

TABLE 2

| Example No. | Dose/ Krad | Conversion % | Gel fraction % | I.V. dl/g |
|---|---|---|---|---|
| 4 | 13 | 85 | 0 | 2.0 |
| 5 | 18 | 91.6 | 22 | 2.4 |
| 6 | 23 | 91.7 | 40 | — |
| 7 | 28 | 95.6 | 81 | — |
| 8 | 33 | 97.5 | 87 | — |
| 9 | 38 | 98.0 | 100 | — |

The products obtained as Examples 4-9 were applied by hot melt extrusion to a polyester webbing utilizing an Acumeter Laboratories LH-1 evaluation coater. The film thickness was about 1.0 μm and the width was 3 inches. Samples of these tapes were exposed to accelerated electrons utilziing an Energy Sciences electron curtain to doses between 0 and 20 Mrads. Table 3 describes the results.

TABLE 3

| Example No. | Polymer Example Coated | Extrusion Temperature (°C.) | Post Application Mrad | Residual Monomer | Tack | Cohesion |
|---|---|---|---|---|---|---|
| 10 | 4 | 200 | 0 | P | G | F |
| 11 | 4 | 200 | 2 | P | G | G |
| 12 | 4 | 200 | 5 | F | G | G |
| 13 | 4 | 200 | 10 | G | G | G |
| 14 | 4 | 200 | 20 | G | G | G |
| 15 | 5 | 240 | 0 | P | G | F |
| 16 | 5 | 240 | 2 | P | G | G |
| 17 | 5 | 240 | 5 | F | G | G |
| 18 | 5 | 240 | 10 | G | F | E |
| 19 | 5 | 240 | 20 | E | F | E |
| 20 | 6 | 240 | 0 | P | G | F |
| 21 | 6 | 240 | 2 | F | G | F |
| 22 | 6 | 240 | 5 | G | G | G |
| 23 | 6 | 240 | 10 | G | G | E |
| 24 | 6 | 240 | 20 | E | F | E |
| 25 | 7 | 240 | 0 | F | G | G |
| 26 | 7 | 240 | 2 | F | G | G |
| 27 | 7 | 240 | 5 | G | G | G |
| 28 | 7 | 240 | 10 | E | F | E |
| 29 | 7 | 240 | 20 | E | P | E* |
| 30 | 8 | 240 | 0 | F | G | F |
| 31 | 8 | 240 | 2 | F | G | F |
| 32 | 8 | 240 | 5 | G | F | G |
| 33 | 8 | 240 | 10 | E | P | G |
| 34 | 8 | 240 | 20 | E | P | E* |
| 35 | 9 | 240 | 0 | F | G | G |
| 36 | 9 | 240 | 2 | F | F | G |
| 37 | 9 | 240 | 5 | F | F | G |

TABLE 3-continued

| Example No. | Polymer Example Coated | Extrusion Temperature (°C.) | Post Application Mrad | Residual Monomer | Tack | Cohesion |
|---|---|---|---|---|---|---|
| 38 | 9 | 240 | 10 | E | P | E |
| 39 | 9 | 240 | 20 | E | P | E* |

P = Poor,
F = Fair,
G = Good,
E = Excellent,
*Deterioration or Embrittlement

EXAMPLE 40

Solventless Polymerization Using Two Dose Rates

A mixture of 2-ethylhexyl acrylate containing 1% isopropyl alcohol was charged into a 2-inch diameter cylindrical reaction vessel and dearated as in Examples 1–3. The vessel was then exposed to gamma radiation at an initial dose rate of 20 krad per hour to 60 krad followed by exposure at 350 krad per hour for an additional 175 krad. The product was a tacky elastic solid which softened to a viscous liquid at about 200° C. The monomer conversion was determined to be 98% and the intrinsic viscosity to be 1.0 dl/g.

EXAMPLES 41–46

Solvent Copolymerizations

A mixture of 44.75 parts 2-ethylhexyl acrylate, 44.75 parts n-butyl acrylate, 5 parts vinyl acetate, 5 parts acrylic acid and 0.5 parts isopropanol was prepared as for example 4 and irradiated using the dose rate and dose indicated in Table 4. Results of the irradiation are given in the table.

EXAMPLE 42

A mixture of 4 parts vinyl acetate, 5 parts acrylic acid, 42.5 parts 2-ethylhexyl acrylate, 42.5 parts n-butyl acrylate and 0.5 parts isopropanol was prepared as for example 4 and irradiated using the dose rate and dose indicated in Table 4. Results of the irradiation are given in the table.

EXAMPLE 43

A mixture of 2.8 parts vinyl acetate, 5 parts acrylic acid, 46.25 parts 2-ethylhexyl acrylate, 42.25 parts butyl acrylate and 0.5 parts isopropanol was prepared as for example 4 and irradiated using the dose rate and dose indicated in Table 4. Results of the irradiation are given in the table.

EXAMPLE 44

A mixture of 94.5 parts 2-ethylhexyl acrylate, 5 parts acrylic acid and 0.5 parts isopropanol was prepared as for example 4 and irradiated using the dose rate and dose indicated in Table 4. Results of the irradiation are given in the table.

EXAMPLE 45

A mixture of 94.5 parts 2-ethylhexyl acrylate, 5 parts acrylic acid, and 0.5 parts isopropanol was prepared as for example 4 and irradiated using the dose rate and dose indicated in Table 4. Results of the irradiation are given in the table.

EXAMPLE 46

A mixture of 47.5 parts 2-ethylhexyl acrylate, 47.5 parts n-butyl acrylate and 5 parts N-vinyl pyrrolidone was prepared as for example 4 and irradiated using the dose rate and dose indicated in Table 4. Results of the irradiation are given in the table.

TABLE 4

| Example No. | Dose Rate Krad/Hr | Dose Krad | Conversion % | Gel fraction % | I.V. dl/g |
|---|---|---|---|---|---|
| 41 | 20 | 52.5 | 99.0 | 20 | 1.4 |
| 42 | 20 | 30.2 | 97.8 | 0 | .75 |
| 43 | 20 | 25 | 94.8 | 10 | 1.30 |
| 44 | 20 | 25 | — | 20 | — |
| 45 | 20 | 42 | — | 45 | — |
| 46 | 20 | 25 | 90.0 | 0 | 3.6 |

EXAMPLES 47–54

Polymerizations in Solvent at Single Dose Rate

Using a procedure similar to that of Examples 1–3, homopolymers of 2-ethylhexyl acrylate were prepared by gamma irradiation in the presence of heptane. The products obtained ranged from elastic solids and viscoelastic semisolids, suitable for hot-melt application to viscous liquids suitable for application, by conventional techniques used with solvent-based adhesives. All products exhibited good tack. Polymerization conditions and results are summarized in Table 5.

TABLE 5

| Example No. | Monomer(s) p.b.w. | Heptane p.b.w. | IPA p.b.w. | Dose Rate Krad/hr | Total Dose KRads | I.V. dl/g | Conversion % | Product Characteristics |
|---|---|---|---|---|---|---|---|---|
| 47 | 2-EHA/90 | 8.5 | 1.5 | 105 | 315 | 1.0 | 98 | ES |
| 48 | 2-EHA/90 | 8.75 | 1.25 | 100 | 300 | 1.9 | 99 | ES |
| 49 | 2-EHA/30 | 70 | 0 | 55 | 187 | 2.0 | 95 | VES |
| 50 | 2-EHA/30 | 70 | 0 | 170 | 510 | 1.4 | 96.4 | VL |
| 51 | 2-EHA/70 | 30 | 0 | 55 | 220 | 3.4 | 100 | |
| 52 | 2-EHA/70 | 30 | 0 | 20 | 77 | 3.6 | 94.7 | |
| 53 | 2-EHA/60 | 40 | 0 | 20 | 77 | 3.2 | 92 | |
| 54 | 2-EHA/50 | 50 | 0 | 190 | 410 | 1.73 | 98 | |

2-EHA = 2-ethylhexyl acrylate
IPA = isopropyl alcohol
I.V. = intrinsic viscosity
ES = elastic solid at room temperature
VES = viscoelastic semisolid at room temperature
VL = viscous liquid at room temperature

What is claimed is:

1. A process for preparing a substrate for bonding which comprises applying to the substrate by hot-melt application a pressure-sensitive adhesive which is produced by the process which comprises:
   (a) introducing, to a sealable reaction vessel, a liquid, polymerizable monomer composition, comprising:

(i) from 65 to 100 parts of at least one acrylate monomer of the formula:

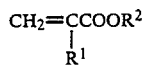

wherein $R^1$ is hydrogen or methyl and $R^2$ is a straight or branched chain alkyl having from 2 to 8 carbon atoms,
(ii) from 0 to 35 parts of at least one ethylenically unsaturated comonomer per 100 parts of liquid polymerizable monomer composition; and
(b) dearating the liquid polymerizable monomer composition before or after introducing it into the vessel; and
(c) polymerizing the monomers in the containers by exposing them to ionizing radiation, at a dose rate greater than 1 kilorad per hour and less than 1 kilorad per second, said polymerization being carried out in the presence of less than 30% by weight of an organic solvent, based on the combined weight of the liquid, polymerizable monomer composition and solvent, so as to produce a viscoelastic polymer mass having a low level of residual monomer and oapable of hot-melt application.

2. A process as claimed in claim 1, wherein the polymerization is carried out in the presence of less than 5% by weight of an organic solvent.

3. A process as claimed in claim 1, wherein the polymerization is carried out in the absence of solvent.

4. A process as claimed in claim 1, wherein the liquid, polymerizable monomer composition also contains from 0 to 4 parts of a chain transfer agent, per 100 parts of liquid, polymerizable monomer composition.

5. A process as claimed in claim 4, wherein the chain transfer agent is selected from isopropyl alcohol and triethanolamine.

6. A process as claimed in claim 1, wherein the liquid, polymerizable monomer composition is exposed to ionizing radiation at a predetermined dose rate in the range of 5 to 250 kilorads per hour.

7. A process as claimed in claim 1, wherein the ionizing radiation is gamma radiation.

8. A process as claimed in claim 1, wherein the liquid, polymerizable monomer composition is placed in a cylindrical container having a diameter of from about 1 inch to about 26 inches and exposed to gamma radiation.

9. A process as claimed in claim 1, wherein the acrylate monomer is selected from the group consisting of 2-ethylhexyl acrylate, n-butyl acrylate, isobutyl acrylate and ethyl acrylate.

10. A process as claimed in claim 1, wherein the ethylenically unsaturated comonomer is selected from the group consisting of acrylic acid, methacrylic acid, acrylonitrile, vinyl acetate and vinyl pyrrolidone.

11. A process as claimed in claim 1, wherein the acrylate monomer is 2-ethylhexyl acrylate.

12. A process as claimed in claim 1, wherein polymerization is carried out to obtain a polymer having an intrinsic viscosity of at least about 2.5 dl/g.

13. A process as claimed in claim 12, wherein the presure-sensitive adhesive is produced by homopolymerization of 2-ethylhexyl acrylate.

14. A process as claimed in claim 1, wherein the liquid, polymerizable monomer composition is exposed to ionizing radiation first at a dose rate in the range of 5 to 250 kilorads per hour and then at a different dose rate in the range of 1 kilorad per hour to 1 kilorad per second.

15. The process of claim 1 wherein the total dosage is between about 0.05 to about 100 kilorads.

16. A process as claimed in claim 1 wherein the total dosage is between about 13 to about 510 kilorads.

17. A process as claimed in claim 16 wherein the acrylate monomer is 2-ethylhexyl acrylate.

18. A process as claimed in claim 1 wherein the total dosage is between about 25 to about 300 kilorads.

19. A process as claimed in claim 1 wherein said viscoelastic polymer mass comprises at least about 95% polymer.

20. A process as claimed in claim 1 wherein said viscoelastic polymer mass comprises at least about 99.5% polymer.

* * * * *